Patented May 15, 1951

2,553,065

UNITED STATES PATENT OFFICE 2,553,065

PROCESS FOR THE PREPARATION OF ALKYL CYANOACETATES

Erwin G. Somogyi, Springfield, Mass., assignor to Monsanto Chemical Company, St. Louis, Mo., a corporation of Delaware No Drawing. Application March 17, 1949, Serial No. 82,023

6 Claims. (Cl. 260—465.4)

This invention relates to alkyl cyanoacetates. More particularly, this invention relates to a novel improved process for the preparation of alkyl cyanoacetates wherein the alkyl substituent contains at least one and not more than eight carbon atoms.

Alkyl cyanoacetates are valuable intermediates for the preparation of various organic compounds. Heretofore, alkyl cyanoacetates have been prepared by esterifying cyanoacetic acid in the presence of a sulfuric acid catalyst. Cyanoacetic acid was obtained by the cyanification of sodium chloroacetate and subsequent acidification with sulfuric acid. This process resulted in the formation of cyanoacetic acid containing considerable quantities of partially precipitated sodium chloride and sodium sulfate. Inasmuch as cyanoacetic acid is unstable tending to hydrolyze to form malonic acid, with such hydrolysis being enhanced in the presence of HCl, heretofore the sodium chloride and sodium sulfate have been precipitated and filtered from the cyanoacetic acid prior to the addition of the sulfuric acid esterification catalyst and subsequent esterification. Such a procedure was utilized to prevent decomposition of the cyanoacetic acid during esterification due to the formation of HCl resulting from the reaction of the sulfuric acid catalyst and the sodium chloride.

Molten cyanoacetic acid is extremely viscous. Furthermore, the filtration of sodium sulfate and sodium chloride is exceeding slow. The combination of these two undesirable characteristics renders precipitation and filtration very difficult resulting in exceptionally long time cycles for the process from which economic disadvantages necessarily result. At times, attempts have been made to decrease filtration difficulties by adding considerable quantities of alcohol to the cyanoacetic acid to aid in the precipitation and to reduce the viscosity as an aid to filtration. Such a practice, however, is uneconomical as long time cycles are still required due to the increased quantity of material to be filtered and solvent loss.

It is an object of this invention to provide an improved process for the preparation of alkyl cyanoacetate.

It is a further object of this invention to provide an improved process for the preparation of alkyl cyanoacetates, wherein the costly and time consuming precipitation and filtration of the inorganic salts formed in the reaction, are eliminated.

Further objects will become apparent from the description of the novel process of this invention and the claims.

It has now been discovered that cyanoacetic acid may be esterified in the presence of sodium chloride and sodium sulfate and also in the presence of a sulfuric acid catalyst without the formation of abnormal quantities of the malonic acid ester and with satisfactory high yields of the cyanoacetic acid ester provided that a certain definite molar ratio of catalyst to cyanoacetic acid is maintained and also provided that a definite maximum temperature is not exceeded during the subsequent removal of water of esterification and excess alcohol. This discovery eliminates the tedious and difficult steps of precipitation and filtration of the sodium salts formed, and permits their removal from the cyanoacetic acid ester by a simple water solution separation thereby greatly enhancing the feasibility of commercial preparation of alkyl cyanoacetates.

In preparing such esters of cyanoacetic acid by the novel process of this invention, cyanoacetic acid containing suspended or partially suspended sodium chloride and sodium sulfate, which have been formed from the preparation of cyanoacetic acid from chloroacetic acid, is esterified with an excess of an alkyl alcohol containing at least one and not more than eight carbon atoms in the presence of from 0.025 to 0.15 mol of $H_2SO_4$ per mol of cyanoacetic acid as a catalyst while removing by distillation the water of esterification formed and the excess alcohol at temperatures not exceeding 140° C.

In the novel process of this invention, the dehydrated cyanoacetic acid salt slurry may be prepared in any conventional manner that will yield a cyanoacetic acid slurry of sodium chloride and sodium sulfate. Obviously, however, the highest possible yield of cyanoacetic acid from chloroacetic acid is desired and consequently certain well known and well founded principles should be observed. The neutralization and subsequent cyanification of chloroacetic acid proceeds essentially quantitatively. Excessive quantities of reactants are therefore unnecessary and impractical. It has been found however, that the acidification of sodium cyanoacetate results in the highest yields of cyanoacetic acid when a slight excess, from approximately 1 to 5% molar excess (0.005 to 0.025 mol excess per mol of cyanoacetic acid), of sulfuric acid is used. Molecular quantities resulted in a slightly lower yield while quantities greater than an approximately 5% molar excess tend to cause decomposition of the cyanoacetic acid during the subsequent dehydration. Furthermore, the concentration of the sulfuric acid solution used in the acidification reaction is not critical. Concentrations of 52°, 60° and 66° Bé. as well as 98% sulfuric acid and higher or alternatively more dilute concentrations, may be used. The actual dehydration of the cyanoacetic acid-salt mixture is preferably done under reduced pressure so as to maintain a kettle temperature below 100° C. at all times. Excessive temperatures necessarily promote decomposition. Dehydration should be substantially complete in order that the subsequent esterification reaction, in which more water is formed, may proceed rapidly to completion.

Only relatively small amounts of the sulfuric acid catalyst are required to produce satisfactory yields of the alkyl cyanoacetate. The operable range of catalyst concentration is from about 0.025 to about 0.15 mol of sulfuric acid per mol of cyanoacetic acid. However the preferred range of catalyst concentration is that of 0.050 to 0.10 mol of sulfuric acid per mol of cyanoacetic acid. Higher catalyst concentrations promote decomposition while lower concentrations decrease the speed and completeness of the reactions. Inasmuch as an excess of sulfuric acid is preferred in the acidification of sodium cyanoacetate, as previously pointed out, the amount of sulfuric acid catalyst to be added prior to esterification must be determined on the basis of this excess sulfuric acid so that the total sulfuric acid present is within the expressed operable or preferred range of catalyst concentration. Thus, for example, if a 0.025 mol excess of sulfuric acid had been used for the acidification of sodium cyanoacetate and it was desired to use 0.10 mol of sulfuric acid per mol cyanoacetic acid as a catalyst in the subsequent esterification, 0.075 mol of sulfuric acid per mol of cyanoacetic acid would be added so that the total catalyst concentration would be 0.10 mol of sulfuric acid per mol of cyanoacetic acid.

The temperature of esterification and distillation of water of esterification and excess alcohol necessarily varies with the esterifying alcohol. However, in order to avoid decomposition, excessive temperatures are to be avoided. Thus, it is essential that during the esterification procedure the stripping of water formed during esterification and the final stripping of excess alcohol under vacuum or at atmospheric pressure, the temperature of the reaction mass does not exceed 140° C. The temperatures in excess of 140° C. promote decomposition.

The quantity of alcohol utilized in the novel process of this invention should be in excess of the theoretical one molecular proportion for each molecular proportion of cyanoacetic acid and preferably in the order of about two molecular proportions for each one molecular proportion of cyanoacetic acid. However, the amount of excess alcohol utilized is not a critical factor. After esterification, any conventional method of purification may be utilized. However, it is preferred that the reaction mixture be neutralized and the salts be dissolved in water and separated from the ester. The ester may then be washed again and subsequently fractionally distilled.

Typical of the many alkyl esters of cyanoacetic acid that may be prepared by the novel process of this invention are the methyl, ethyl, propyl, isopropyl, butyl, isobutyl, sec.-butyl, tert.-butyl, amyl, isoamyl, hexyl, 2 - ethylbutyl, 2 - methylpentyl, heptyl, n-octyl, capryl, and the 2-ethylhexyl esters.

The advantages, features, and preferred quantities of reactants of the novel process of this invention are illustrated by the following examples:

EXAMPLE I

Methyl cyanoacetate

To 378 grams (4 mols) of chloroacetic acid dissolved in 466 ml. of water and contained in a suitable glass vessel equipped with vigorous agitation, was added a 30% aqueous solution of sodium hydroxide in sufficient quantity to neutralize the chloroacetic acid. During neutralization, the temperature was maintained at 35° to 40° C.

After neutralization, 218 grams (4 mols corrected for assay) of coarsely milled sodium cyanide was slowly added to the sodium chloroacetate solution, maintaining a reaction temperature of 50°-60° C. during cyanification.

The sodium cyanoacetate solution was then cooled to 35° to 40° C. and 265 grams of 60° Bé. sulfuric acid (2.1 mols) slowly added.

The acidified solution of cyanoacetic acid was then dehydrated under vacuum until a maximum batch temperature of 65° C. at 20 mm. Hg absolute pressure was attained. This dehydration resulted in a thick acid-salt slurry. To the dehydrated slurry, 256 grams (approx. 8 mols) of methanol was added with agitation.

The container containing the methanol-acid-salt slurry was then connected to an efficient column for the esterification reaction. 40 grams of 98% sulfuric acid (approximately 0.10 mol per mol of cyanoacetic acid) was added with agitation to the methanol-acid-salt slurry. The total catalyst concentration was therefore 0.125 mol per mol of cyanoacetic acid. The esterification was carried out by refluxing the mixture and removing the water of esterification by distillation. When esterification was complete, the excess methanol was stripped off until a maximum kettle temperature of 120° C. was obtained.

Sufficient water was then added to the essentially methanol-free ester-salt slurry to dissolve the salts. The slurry was neutralized with a 25% soda ash solution and the ester-water layers allowed to separate. The ester layer was then fractionated in the normal manner and the pure methyl cyanoacetate obtained.

EXAMPLE II

Ethyl cyanoacetate

A dehydrated 4 gram mol batch of cyanoacetic acid was prepared according to the procedure described in Example I resulting in a thick acid-salt slurry. 370 grams (approximately 8 mols) of ethanol was added, with agitation to the dehydrated slurry.

The container containing the ethanol-acid-salt slurry was then connected to an efficient column for the esterification reaction. 40 grams of 98% sulfuric acid (approximately 0.10 mol per mol of cyanoacetic acid) was added with agitation to the ethanol-acid-salt slurry. The total catalyst concentration was therefore 0.125 mol per mol of cyanoacetic acid. The slurry required vigorous agitation to keep the salts suspended. The esterification was carried out by refluxing the reaction mixture and removing the water of esterification by distillation. When esterification was complete the excess ethanol was stripped off until a maximum kettle temperature of 120° C. was attained.

Sufficient water was then added to the essentially ethanol-free ester-salt slurry to dissolve the salts. The slurry was neutralized with a 25% soda ash solution and the ester-water layers allowed to separate. The crude ester was then purified in the manner described in Example I and the substantially pure ethyl cyanoacetate obtained.

EXAMPLE III

Butyl cyanoacetate

A dehydrated 4 gram mol batch of cyanoacetic acid was prepared according to the procedure described in Example I resulting in a thick acid-salt slurry. 600 grams (approximately 8 mols) of butanol was added with agitation to the dehydrated slurry.

The container containing the butanol-acid-salt slurry was then connected to an efficient column for the esterification reaction. The column was equipped with a condenser and a water receiver with an overflow for butanol return to the esterification kettle. 30.5 grams of 98% sulfuric acid (approx. 0.075 mol per mol of cyanoacetic acid) was added with agitation to the butanol-acid-salt slurry. The total catalyst concentration was therefore 0.10 mol per mol of cyanoacetic acid. The slurry required vigorous agitation to keep the salts suspended. The esterification was carried out over a temperature range of 105° to 130° C. kettle temperature. When esterification was complete, the batch was cooled to 80° C., and the excess butanol stripped off at 100 mm. Hg abs. pressure to a maximum kettle temperature of 120° C.

Sufficient water was then added to the essentially butanol-free ester-salt slurry to dissolve the salts. The slurry was neutralized with a 25% soda ash solution and the ester-water layers allowed to separate. The ester layer was then fractionated in the normal manner under vacuum and the purified butyl cyanoacetate obtained in an 87% yield based on chloroacetic acid.

The butyl cyanoacetate thus obtained was a clear colorless liquid. It was insoluble in water and soluble in alcohol. It had a boiling point of 115° C. at 15 mm. pressure, a specific gravity of 0.998 at 25°/4° C., and a $N_D^{25}$ of 1.4243.

EXAMPLE IV

Isobutyl cyanoacetate

A dehydrated 4 gram mol batch of cyanoacetic acid was prepared according to the procedure described in Example I resulting in a thick acid-salt slurry. To the dehydrated slurry was added 600 grams (approximately 8 mols) of isobutanol.

The container containing the isobutanol-acid-salt slurry was then connected to an efficient column for the esterification reaction. The column was equipped with a condenser and a water receiver with an overflow for the butanol return to the esterification kettle. 30.5 grams of 98% sulfuric acid (approximately 0.075 mol per mol of cyanoacetic acid) was added with agitation to the isobutanol-acid-salt slurry. The total catalyst concentration was therefore 0.10 mol per mol of cyanoacetic acid. The slurry required vigorous agitation to keep the salts suspended. The esterification was carried out over a temperature range of 105° to 130° C. and was continued until no more water distilled forward at 130° C. kettle temperature. When esterification was complete, the batch was cooled to 80° C., and the excess butanol stripped off at 100 mm. Hg absolute pressure to a maximum kettle temperature of 120° C.

Sufficient water was then added to the essentially isobutanol-free ester-salt slurry to dissolve the salts. The slurry was neutralized with a 25% soda ash solution and the ester-water layers allowed to separate. The ester layer was then fractionated in the normal manner under vacuum and the purified isobutyl cyanoacetate obtained in an 86.5% yield based on chloroacetic acid.

The isobutyl cyanoacetate thus obtained was a clear colorless liquid having a boiling point of 116° C. at 20 mm. pressure.

EXAMPLE V

Amyl cyanoacetate

A dehydrated 4 gram mol batch of cyanoacetic acid was prepared according to the procedure described in Example I resulting in a thick acid-salt slurry. 705 grams (approximately 8 mols) of amyl alcohol were added with agitation to the dehydrated slurry.

An efficient column was attached to the amyl alcohol-acid-salt slurry container for the esterification reaction. 40 grams of 98% sulfuric acid (approximately 0.10 mol per mol of cyanoacetic acid) were added with agitation to the amyl alcohol-acid-salt slurry. The total catalyst concentration was therefore 0.125 mol per mol of cyanoacetic acid. The esterification was carried out over a temperature range of 105° to 130° C. and was continued until no more water distilled forward at 130 C. kettle temperature. The batch was then cooled and the excess amyl alcohol stripped off at 100 mm. Hg absolute pressure to a maximum kettle temperature of 120 C.

Sufficient water was then added to the essentially amyl alcohol-free ester-salt slurry to dissolve the salts. The slurry was neutralized with a 25% soda ash solution and the ester-water layers allowed to separate.

The crude ester was then purified in the manner described in Example I and the substantially pure amyl cyanoacetate obtained.

EXAMPLE VI

2-ethylhexyl cyanoacetate

A dehydrated 4 gram mol batch of cyanoacetic acid was prepared according to the procedure described in Example I resulting in a thick acid-salt slurry. 1040 grams (approximately 8 mols) of 2-ethylhexanol was added with agitation to the dehydrated slurry.

An efficient column was attached to the 2-ethylhexanol-acid-salt slurry container for the esterification reaction. 28 grams of 98% sulfuric acid (approximately 0.07 mol per mol of cyanoacetic acid) was added with agitation to the 2-ethylhexanol-acid-salt slurry. The total catalyst concentration was therefore 0.095 mol per mol of cyanoacetic acid. The esterification was carried out over a temperature range of 105° to 130° C. and was continued until no more water distilled forward at 130° C. kettle temperature. The batch was then cooled and the excess 2-ethylhexanol stripped off at 50 mm. Hg absolute pressure to a maximum kettle temperature of 120° C.

Sufficient water was then added to the essentially 2-ethylhexanol-free ester-salt slurry to dissolve the salts. The slurry was neutralized with a 25% soda ash solution and the ester-water layers allowed to separate.

The crude ester was then purified in the manner described in Example I and the substantially pure 2-ethylhexyl cyanoacetate obtained.

EXAMPLE VII

Illustrative of the operability of the novel process of this invention were the results obtained when the catalyst content of the reaction mass approached the higher operable limit. Thus, butyl cyanoacetate when prepared in accordance with the procedure set forth in Example III, but utilizing a total catalyst concentration of 0.14 mol of $H_2SO_4$ per mol of cyanoacetic acid, decreased the yield of butyl cyanoacetate to about 65 to 70% and caused the formation of decomposition products which made purification of the resulting ester slightly more difficult but none the less feasible. As the catalyst charge was increased beyond about 0.15 mol of $H_2SO_4$ per mol of cyanoacetic acid, the yield decreased rapidly and the formation of decomposition products significantly increased.

What is claimed is:

1. In the process for the preparation of an alkyl cyanoacetate wherein the alkyl substituent contains at least one and not more than eight carbon atoms, the steps comprising reacting cyanoacetic acid with an excess of an alkyl alcohol containing at least one and not more than eight carbon atoms in the presence of sodium chloride and sodium sulfate and from about 0.025 to about 0.15 mol of sulfuric acid per mol of cyanoacetic acid, while removing by distillation the water of esterification and the excess of said alkyl alcohol at temperatures not exceeding about 140° C.

2. In a process for the preparation of an alkyl cyanoacetate wherein cyanoacetic acid is esterified with an alkyl alcohol containing at least one but not more than eight carbon atoms, the steps comprising adding the alkyl alcohol in an excess of the amount required for the esterification of the cyanoacetic acid to a slurry resulting from the preparation of cyanoacetic acid and containing cyanoacetic acid, sodium chloride and sodium sulfate, adjusting the sulfuric acid content of the reaction mixture to within the range of about 0.025 to about 0.15 mol of sulfuric acid per mol of cyanoacetic acid present and removing by distillation the water of esterification and the unreacted alkyl alcohol at temperatures not exceeding about 140° C.

3. In a process for the preparation of an alkyl cyanoacetate wherein cyanoacetic acid is esterified with an alkyl alcohol containing at least one but not more than eight carbon atoms, the steps comprising adding the alkyl alcohol in an excess of the amount required for the esterification of the cyanoacetic acid to a slurry resulting from the preparation of cyanoacetic acid and containing cyanoacetic acid, sodium chloride and sodium sulfate, adjusting the sulfuric acid content of the reaction mixture to within the range of about 0.05 to about 0.10 mol of sulfuric acid per mol of cyanoacetic acid present and removing by distillation the water of esterification and the unreacted alkyl alcohol at temperatures not exceeding about 140° C.

4. A process for the preparation of ethyl cyanoacetate according to claim 3, wherein the alkyl alcohol is ethyl alcohol.

5. A process for the preparation of butyl cyanoacetate according to claim 3, wherein the alkyl alcohol is butyl alcohol.

6. A process for the preparation of isobutyl cyanoacetate according to claim 3, wherein the alkyl alcohol is isobutyl alcohol.

ERWIN G. SOMOGYI.

REFERENCES CITED

The following references are of record in the file of this patent:

UNITED STATES PATENTS

| Number | Name | Date |
| --- | --- | --- |
| 2,338,834 | Britton et al. | Jan. 11, 1944 |
| 2,350,370 | Schopmeyer et al. | June 6, 1944 |
| 2,426,056 | Rust | Aug. 19, 1947 |
| 2,480,380 | Nicholl et al. | Aug. 30, 1949 |

OTHER REFERENCES

Phelps et al.: Am. J. Sci., vol. 26, pp. 264–280 (1908).

Kohler et al.: "Org. Syntheses," vol. 3, pp. 53–56 (1923).

Inglis: "Org. Syntheses," vol. 8, pp. 74–76 (1928).